United States Patent
Dooley et al.

(10) Patent No.: US 10,115,234 B2
(45) Date of Patent: Oct. 30, 2018

(54) MULTIPLATFORM BASED EXPERIENCE GENERATION

(71) Applicant: ACCENTURE GLOBAL SOLUTIONS LIMITED, Dublin (IE)

(72) Inventors: Robert Dooley, Dublin, CA (US); Sunny Webb, San Francisco, CA (US); Matthew Thomas Short, San Jose, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 112 days.

(21) Appl. No.: 15/076,252

(22) Filed: Mar. 21, 2016

(65) Prior Publication Data

US 2017/0270713 A1    Sep. 21, 2017

(51) Int. Cl.
| | |
|---|---|
| *G06T 19/00* | (2011.01) |
| *G06F 9/451* | (2018.01) |
| *G06F 3/01* | (2006.01) |
| *G06F 9/44* | (2018.01) |
| *G06F 9/455* | (2018.01) |

(52) U.S. Cl.
CPC ............ *G06T 19/006* (2013.01); *G06F 3/011* (2013.01); *G06F 9/4443* (2013.01); *G06F 9/451* (2018.02); *G06F 9/455* (2013.01)

(58) Field of Classification Search
None
See application file for complete search history.

(56) References Cited

U.S. PATENT DOCUMENTS

| | | | |
|---|---|---|---|
| 2012/0122570 A1 | 5/2012 | Baronoff | |
| 2012/0231887 A1 | 9/2012 | Lee et al. | |
| 2012/0249741 A1* | 10/2012 | MacIocci | G06F 3/011 348/46 |
| 2012/0299827 A1* | 11/2012 | Osborn | G09G 5/08 345/158 |

(Continued)

FOREIGN PATENT DOCUMENTS

EP    2400464 A2    12/2011

OTHER PUBLICATIONS

Anonymous: "Final Fantasy XIV: A Realm Reborn—Wikipedia", Feb. 26, 2016, 21 pages. Retrieved from the Internet on Oct. 27, 2017: <https://en.wikipedia.org/w/index.php?title=Final_Fantasy_XIV:_A_Realm_Reborn&oldid=706959950>.

*Primary Examiner* — Ryan M Gray
(74) *Attorney, Agent, or Firm* — Mannava & Kang, P.C.

(57) ABSTRACT

According to examples, multiplatform based experience generation may include determining a set of connected devices that provide services related to virtual reality, and determining a platform type of each of the connected devices. Multiplatform based experience generation may further include receiving an indication of a modification to an intrinsic property of a virtual object on one of the set of connected devices, and generating, based on the received indication of the modification to the intrinsic property of the virtual object, a modification to a master version of the virtual object. Based on the platform type of another one of the set of connected devices and based on the modification to the master version of the virtual object, an indication of a modification to an intrinsic property of a virtual object on the another one of the set of connected devices may be generated.

20 Claims, 10 Drawing Sheets

(56) References Cited

U.S. PATENT DOCUMENTS

| | | | |
|---|---|---|---|
| 2013/0117377 A1* | 5/2013 | Miller | H04L 67/38 709/205 |
| 2014/0128161 A1* | 5/2014 | Latta | A63F 13/06 463/42 |
| 2016/0027214 A1* | 1/2016 | Memmott | G02B 27/0172 345/633 |

* cited by examiner

MULTIPLATFORM BASED EXPERIENCE GENERATION

BACKGROUND

Mixed reality (MR) may be described as the merging of real and virtual worlds where new environments and visualizations may be produced to provide for real-time co-existence and interaction of physical and digital objects. Mixed reality experiences add virtual content to a user's perception of the real world, merging the two into a single seamless experience beyond what is offered by augmented reality or virtual reality.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
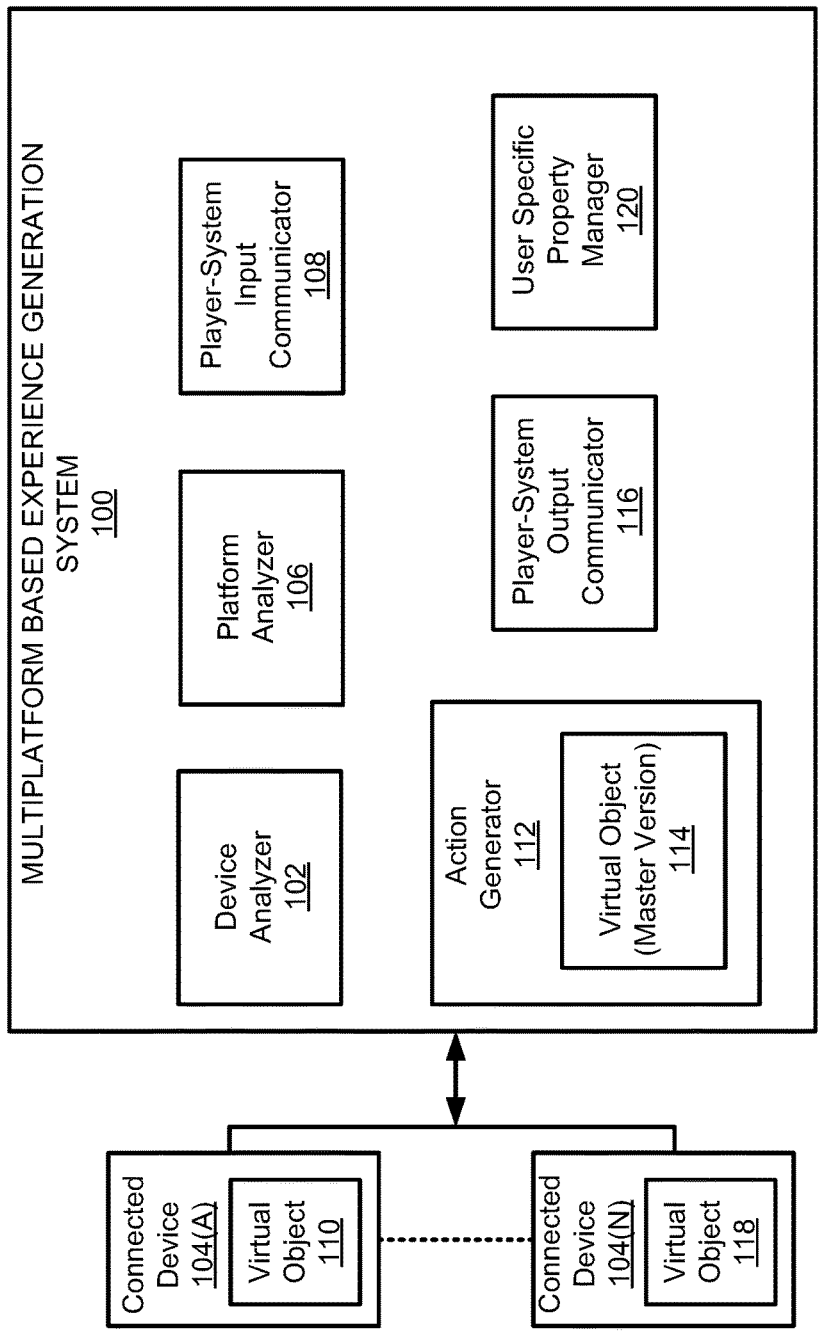
FIG. 1 illustrates an architecture of a multiplatform based experience generation system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

With respect to mixed reality, digital content may be provided in a real-world setting. For example, the digital content may include a real-world position in space relative to a real-world object (e.g., a digital bottle may be positioned on a real-world shelf). Mixed reality may provide for actions on the digital content (e.g., modifying by moving, changing shape, changing other attributes, etc.), relative to the real-world object.

With respect to interaction with digital content, a variety of different types of platforms may be used for such interaction. For example, with respect to a personal computer (PC), a user may utilize keyboard and/or mouse click operations, for example, to drag to move digital content relative to a digital display of a real-world object. According to another example, in a mobile environment (e.g., a mobile phone, or another such device), a user may use touch screen, tilt, and other such operations to maneuver digital content relative to the digital display of the real-world object. According to another example, a user may utilize mixed reality glasses to interact with digital content relative to the real-world object. These different types of platforms may include different types of functionalities or lack thereof with respect to actions that may be performed on the digital content. For example, a PC-based platform may allow a user to use mouse click and replicate functionality to generate a plurality of digital objects from a single digital object. According to another example, a mixed reality glasses-based platform may allow a user to move, for example, by using the user's hands, a digital object as needed. Thus, different types of platforms may include different types of capabilities and limitations, where implementation of a particular functionality for a first platform type may not be available, or may be achievable with a higher degree of complexity, for a second platform type. Moreover, a user for a first type of platform (e.g., a PC-based platform) may first utilize the first type of platform to implement different types of functionality with respect to a digital object, and then use second (or further platform; e.g., a mixed reality platform) to implement yet further types of functionality with respect to the digital object that are not available on the first type of platform.

In order to address the various challenges and limitations associated with different types of platforms that may be used with digital content, a multiplatform based experience generation system and a method for multiplatform based experience generation are disclosed herein. The system and method disclosed herein may provide an integrated framework for developing different experiences of the same virtual scene. For example, based on the type of device that is being used by a user, the type of screen or input devices that is being used, or which specific user is performing an action, the experience a user obtains of the same virtual environment may be different. The system and method disclosed herein may thus provide for the integration and implementation of different experiences on different devices. For example, when a PC is being used, a user may receive a keyboard and mouse based input experience with a fully virtual, two-dimensional (2D) view on the computer screen of a virtual scene. According to another example, when a mixed reality device (e.g., augmented reality glasses) is being used (e.g., simultaneously or at a different time compared to the PC), the user (or a different user) may receive a gesture based input experience and receive visuals that are displayed as virtual three-dimensional (3D) objects on top of real world markers of the same virtual scene. In this regard, multiple users, each with their own choice of device and therefore experience, may share aspects of their work. For example, a PC-based user may add items to a virtual scene, while a mixed reality-based user in a different physical location may take those items and place the items around the real world.

For the system and method disclosed herein, instead of experiencing a virtual environment through one particular platform, each user of a different type of platform may experience a virtual environment through their own specific platform, and engage the same virtual environment through the capabilities of their own platform. The system and method disclosed herein may thus unify the interaction of a plurality of users who are on different types of platforms with a common virtual environment, and provide for the users to interact with each other and with the common virtual environment based on the capabilities of their specific platform.

In order to unify the interaction of a plurality of users who are on different types of platforms with a common virtual object, for the system and method disclosed herein, a common virtual environment may be defined to include an anchor that is used as a basis for manipulation of a virtual object for different types of platforms. The system and method disclosed herein may also provide for unification of the interaction of a plurality of users who are on different types of platforms with a common virtual object by analyzing actions (e.g., mouse click and drag operations for a PC-based platform, grab and move operations for a mixed reality glasses-based platform, etc.) for different types of platforms, and implementing the actions in a manner that is specific to each user's platform. For example, a mouse click and drag operation for a PC-based platform may be analyzed, and results of the mouse click and drag operation may be implemented as a grab and move operation for a mixed reality glasses-based platform, and vise-versa. Thus, the system and method disclosed herein may operate as an intermediary between different types of platforms by analyzing various operations on each of the platforms, translating the operations on each of the platforms, for example, into an intermediate canonical format, and implementing the different types of analyzed operations on each of the platforms in a manner that is specific to each platform.

The multiplatform based experience generation system and the method for multiplatform based experience generation disclosed herein provide a technical solution to technical problems related, for example, to implementation of modification to an intrinsic property of a virtual object on one device that includes a first device platform type and to a virtual object on another device that includes a second (and different) device platform type. The system and method disclosed herein further provide a technical solution to technical problems related, for example, to communication between different devices that include different platform types associated with operations on virtual objects. The system and method disclosed herein further provide a technical solution to technical problems related, for example, to control of operations on virtual objects on devices that include different platform types. The system and method disclosed herein further provide technical benefits of reduction in machine readable instructions that are needed to implement a multiplatform application, and a reduction in potential failure points between experiences on different platforms. For example, by using the framework of the system and method disclosed herein, synchronization errors with respect to communication between two platforms of a different type may be reduced, because the platforms are built from the same machine readable instructions base. The system and method disclosed herein may provide technical benefits to developers, as well as users who receive an experience with a reduced potential for errors. The system and method disclosed herein may also provide technical benefits including improving realism, compensating for reduced or minimal hardware capabilities, or taking advantage of enhanced hardware capabilities. In this regard, with respect to hardware characteristics of a device and improvement of realism and/or facilitation of user interaction in view of these hardware characteristics, upon execution of the system, the system may first determine a device the system is being executed with or on. Considerations related to the device may include (but are not limited to) the screen type (e.g., flat screen, three-dimensional flat screen display, stereoscopic flat screen, stereoscopic only display, etc.), the screen resolution, the power of an associated graphics card and processor executing the system, and any attached control devices (e.g., mice, keyboards, joysticks, controllers, wands, etc.). Using this information, the system and method disclosed herein may alter the experience of a user according to a set of built-in rules provided by the framework of the system and method disclosed herein, and a set of application specific, custom written rules provided by an application developer and written to account for the classes and methods of the system framework. These aspects may provide for adjustment of the system operation on a device to thus provide an improved user experience.

According to examples, a multiplatform based experience generation system is disclosed herein and may include a device analyzer that is executed by at least one hardware processor to determine a set of connected devices that provide services related to virtual reality (e.g., virtual reality itself, mixed reality, augmented reality, and generally, any type of services related to modification of reality). A platform analyzer that is executed by the at least one hardware processor may determine a platform type of each of the connected devices. A player-system input communicator that is executed by the at least one hardware processor may receive an indication of a modification (e.g., change of a location, rotation angle, content, etc.) to an intrinsic property (e.g., location, rotation angle, material, density, etc., and generally any property that is specific to a virtual object) of a virtual object on one of the set of connected devices. An action generator that is executed by the at least one hardware processor may generate, based on the received indication of the modification to the intrinsic property of the virtual object, a modification to a master version of the virtual object. A player-system output communicator that is executed by the at least one hardware processor may generate, based on the platform type of another one of the set of connected devices and based on the modification to the master version of the virtual object, an indication of a modification to an intrinsic property of a virtual object on the another one of the set of connected devices. The virtual object on the one of the set of connected devices may be generally identical to the virtual object on the another one of the set of connected devices.

The system and method disclosed herein may include a variety of applications, such as, for example, navigation, simulation, etc., and virtually any environment where mixed reality, virtual reality, and/or augmented reality may be applied. Generally, the system and method disclosed herein may include any application related to three-dimensional design, machine repair and maintenance, and any remote collaborative work (e.g., where different people in different locations have to work together, such as, collaborative guidance for machine repair). For the system and method disclosed herein, various custom operations may be added as needed. For example, if a machine part is to be colored to identify a repair status, the system and method disclosed herein may be customized to add machine readable instructions to set up rules related to the color shading of a machine part. In this regard, according to an example, a remote expert on a personal computer may be provided with the authority to determine if a machine part is in need of service (e.g., based on a maintenance schedule). Further, a virtual machine model may be added, where the virtual machine model may include color as an intrinsic property (as disclosed herein) that would change for all users. Thus, by customizing the system and method disclosed herein, and further including a custom set of rules (that allow only an expert to change the color), and a color changing script, the system and method disclosed herein may provide for collaborative functionality.

FIG. 1 illustrates a multiplatform based experience generation system 100 (e.g., system 100 as disclosed herein), according to an example of the present disclosure. Referring to FIG. 1, the system 100 may include a device analyzer 102 (where the device analyzer may be executed by at least one hardware processor (e.g., the processor 1002 of FIG. 10), or otherwise, the device analyzer may be designated as a device hardware analyzer) to determine a set of connected devices 104 that provide services related to virtual reality. Examples of services related to virtual reality include virtual reality itself, mixed reality, augmented reality, and generally, any type of services related to modification of reality. For the example of FIG. 1, the connected devices 104 may be designated as connected device (A) to connected device (N). Each of the connected devices 104 may include a virtual object as disclosed herein, or some of the connected devices 104 may include a virtual object that is subject to a particular experience.

A platform analyzer 106 (where the platform analyzer may be executed by at least one hardware processor, or otherwise, the platform analyzer may be designated as a platform hardware analyzer) may determine a platform type of each of the connected devices 104. A platform type may include capabilities and functionalities such as, for example, input characteristics, output characteristics, processing power, and storage capacity characteristics. For example, a PC-based platform type may include keyboard and mouse based input characteristics, whereas a mobile phone platform type may include touchscreen based input characteristics, and a mixed reality platform type may include gesture based input characteristics. A PC-based platform type and a mobile phone platform type may include screen based output characteristics, whereas a mixed reality platform type may include a three-dimensional display based output characteristics. Thus, generally, input characteristics may include touchscreen, keyboard, mouse, joystick, output characteristics may include screen size, processing power measured in GHz along with processor characteristics (e.g., architecture), and storage capacity characteristics may include the type of storage as well as the capacity. Each platform type may be a combination of the above.

A player-system input communicator 108 (where the player-system input communicator may be executed by at least one hardware processor, or otherwise, the player-system input communicator may be designated as a player-system input hardware communicator) may receive an indication of a modification (e.g., change of a location, rotation angle, etc.) to an intrinsic property (e.g., location, rotation angle, material, density, etc., and generally any property that is specific to a virtual object) of a virtual object 110 on one (e.g., one connected device) of the set of connected devices 104. For the example of FIG. 1, for illustrative purposes only, the virtual object 110 is illustrated on the connected device 104(A), but the virtual object 110 may be on any of the connected devices 104(A) to 104(N). With respect to the player-system input communicator 108, a platform type may be used to generate the indication of the modification to the intrinsic property of the virtual object 110 based, for example, on the aforementioned input characteristics of the platform type. For example, a PC-based platform type may generally provide for movement of the virtual object 110 in a two-dimensional plane (or in three-dimensions if available), whereas a mixed reality based platform type may provide for movement of the virtual object 110 in three-dimensional space.

An action generator 112 (where the action generator may be executed by at least one hardware processor, or otherwise, the action generator may be designated as an action hardware generator) may generate, based on the received indication of the modification to the intrinsic property of the virtual object 110, a modification to a master version of the virtual object 114. The master version of the virtual object 114 may include a position of the virtual object 114 in a virtual space, and a definition of the virtual space. The master version of the virtual object 114 may be characterized with respect to its intrinsic properties (e.g., location, rotation angle, material, density, etc., and generally any property that is specific to the master version of the virtual object 114). The master version of the virtual object 114 may differ from the versions of the virtual objects in the connected devices 104 in that the versions of the virtual objects in the connected devices 104 may be different (e.g., not updated) than the master version of the virtual object 114 prior to being updated to include modifications to intrinsic properties that are included in the master version of the virtual object 114.

A player-system output communicator 116 (where the player-system output communicator may be executed by at least one hardware processor, or otherwise, the player-system output communicator may be designated as a player-system output hardware communicator) may generate, based on the platform type of another one (e.g., another connected device) of the set of connected devices 104 and based on the modification to the master version of the virtual object 114, an indication of a modification to an intrinsic property of a virtual object 118 on the another one of the set of connected devices 104. The virtual object 110 on the one of the set of connected devices 104 may be generally identical to the virtual object 118 on the another one of the set of connected devices 104. With respect to the aspect of "generally identical", the virtual object 110 on the one of the set of connected devices 104 may include the properties of the virtual object 118 on the another one of the set of connected devices 104 based on the capabilities of the respective connected device. For example, if a connected device is not capable of displaying a certain property (e.g., a certain color) of a virtual object, in that event, the virtual object 110 on the one of the set of connected devices 104 may include all of the properties of the virtual object 118 on the another one of the set of connected devices 104, except the property that is not capable of being displayed. For the example of FIG. 1, for illustrative purposes only, the virtual object 118 is illustrated on the connected device 104(N), but the virtual object 118 may be on any of the connected devices 104(A) to 104(N).

According to examples, the player-system output communicator 116 may generate, based on the platform type of the another one of the set of connected devices 104 and based on the modification to the master version of the virtual object 114, the indication of the modification to the intrinsic property of the virtual object 118 on the another one of the set of connected devices 104 by analyzing the modification to the master version of the virtual object 114 relative to a global anchor, and generating, based on the platform type of the another one of the set of connected devices 104 and based on the modification to the master version of the virtual object 114 relative to the global anchor, the indication of the modification to the intrinsic property of the virtual object 118 relative to a global anchor on the another one of the set of connected devices 104.

According to examples, the player-system output communicator 116 may generate, based on the platform type of the another one of the set of connected devices 104 and based on the modification to the master version of the virtual object 114, the indication of the modification to the intrinsic property of the virtual object 118 on the another one of the set of connected devices 104 by determining, based on the platform type of another one of the set of connected devices 104, capabilities of the another one of the set of connected devices 104 to perform the modification to the intrinsic property of the virtual object 118 on the another one of the set of connected devices 104, updating, based on the capabilities of the another one of the set of connected devices 104 to perform the modification to the intrinsic property of the virtual object 118 on the another one of the set of connected devices 104, the modification to the intrinsic property of the virtual object 110 on the one of the set of connected devices 104, and generating, based on the update to the modification to the intrinsic property of the virtual object 110 on the one of the set of connected devices 104 and based on the modification to the master version of the virtual object 114, the indication of the modification to the intrinsic property of the virtual object 118 on the another one of the set of connected devices 104.

A user specific property manager 120 (where the user specific property manager may be executed by at least one hardware processor, or otherwise, the user specific property manager may be designated as a user specific property hardware manager) may coordinate management of a user specific property related to the another one of the set of connected devices 104 based on the platform type of the another one of the set of connected devices 104.

According to examples, the intrinsic property of the virtual object 110 on the one of the set of connected devices 104 may include a location (a rotation angle, or any other type of property) of the virtual object 110 on the one of the set of connected devices 104, and the intrinsic property of the virtual object 118 on the another one of the set of connected devices 104 may include corresponding movement of the virtual object 118 on the another one of the set of connected devices 104.

According to examples, the platform type of the one of the set of connected devices 104 and the platform type of the another one of the set of connected devices 104 may be selected from a PC, a mixed reality system, a mobile phone, virtual reality glasses, or any other type of platform related to virtual reality, and the platform type of the one of the set of connected devices 104 may be different from the platform type of the another one of the set of connected devices 104.

In this regard, the system 100 may provide for the handling of different input methods of requesting changes to the master version of the virtual object 114, based on the device a user is using.

According to examples, the master version of the virtual object 114 may be positioned in space with respect to a global anchor. According to examples, the global anchor may include a virtual structure (e.g., a virtual two-dimensional platform), for example, for a PC platform type device. According to examples, the global anchor may include a real structure (e.g., a table), for example, for a mixed reality platform type device. According to examples, coordinates of the virtual object 110 on the one of the set of connected devices 104 relative to a global anchor on the one of the set of connected devices 104 may be identical to coordinates of the virtual object 118 on the another one of the set of connected devices 104 relative to a global anchor on the another one of the set of connected devices 104.

The system 100 may provide for the handling of simultaneous modifications between different connected devices 104 by implementing a free-for-all mode or a lock mode. In the free-for-all mode, any connected device 104 may be free to request changes to their virtual object at any time. Two connected devices 104 may attempt to change the same virtual object at the same time. This would result in a change in the master version of the virtual object 114 that reflects the order in which those requests arrived to the system 100 that stores the master version of the virtual object 114. In the lock mode, the system 100 that stores the master version of the virtual object 114 may ignore requests to modify the master version of the virtual object 114 while a particular connected device 104 is currently sending modification updates.

As disclosed herein, a device may not include capabilities of performing a modification to a virtual object that is performed by another device. In this regard, different users may include different controls and capabilities depending on the platform they use. For example, with respect to an oil and gas setting where a field worker, wearing mixed reality glasses, is attempting to repair a rig while being coached by a remote expert at a PC-based platform, the remote expert may want to see a camera feed from the field worker, but the field worker may likely not be interested in looking at the remote expert's desk. Therefore, only the remote expert, by virtue of their PC-based platform and role, may be allowed to open a video feed.

Figure 2:
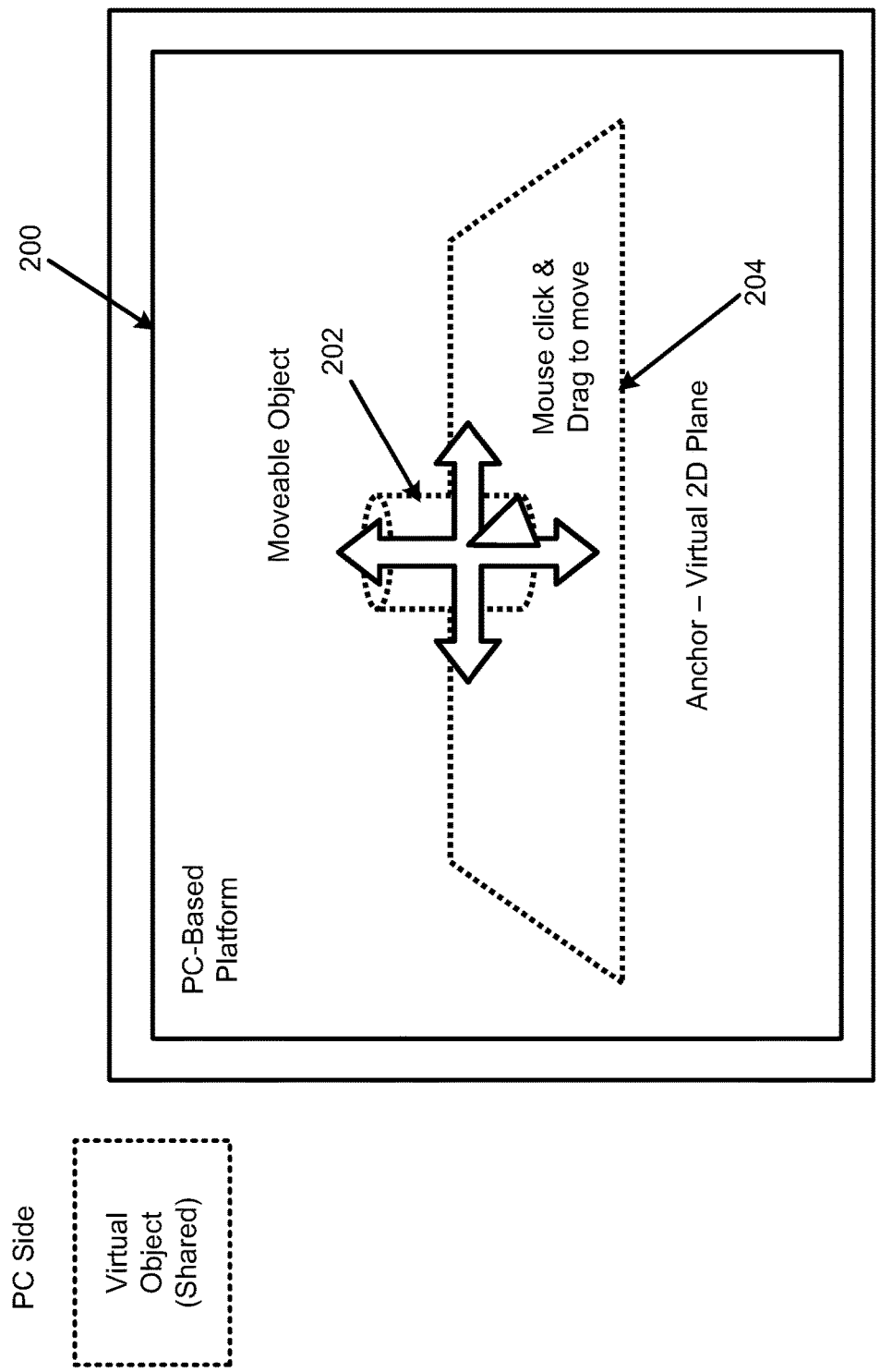
FIG. 2 illustrates individual experiences for the multiplatform based experience generation system of FIG. 1 for a personal computer (PC) based platform, according to an example of the present disclosure.

FIG. 2 illustrates individual experiences for the system 100 for a PC-based platform, according to an example of the present disclosure.

Referring to FIG. 2, for a PC-based platform, a user of the system 100 may view a virtual object (e.g., a shared virtual object) on a PC user interface (UI) display 200. For the example of FIG. 2, the virtual object may include a movable object 202 (e.g., a can of soda) that is movable in a variety of directions (e.g., x and y directions in the orientation of FIG. 2) by using, for example, mouse click and drag operations. The movable object 202 may be anchored, for example, in a global anchor 204 which is represented by a virtual 2D plane. For the PC-based platform, the virtual 2D plane may be positioned relative to a virtual origin, and the movable object 202 may be displayed and moved relative to the virtual 2D plane. For example, the virtual origin may be defined relative to a virtual camera position that is used to initially generate a layout of the movable object 202 in the PC-based platform. Thus, upon initializing of the PC-based platform, for the example of FIG. 2, the PC UI display 200 may include the movable object 202 (e.g., the can of soda) displayed at a center of the virtual 2D plane.

Figure 3:
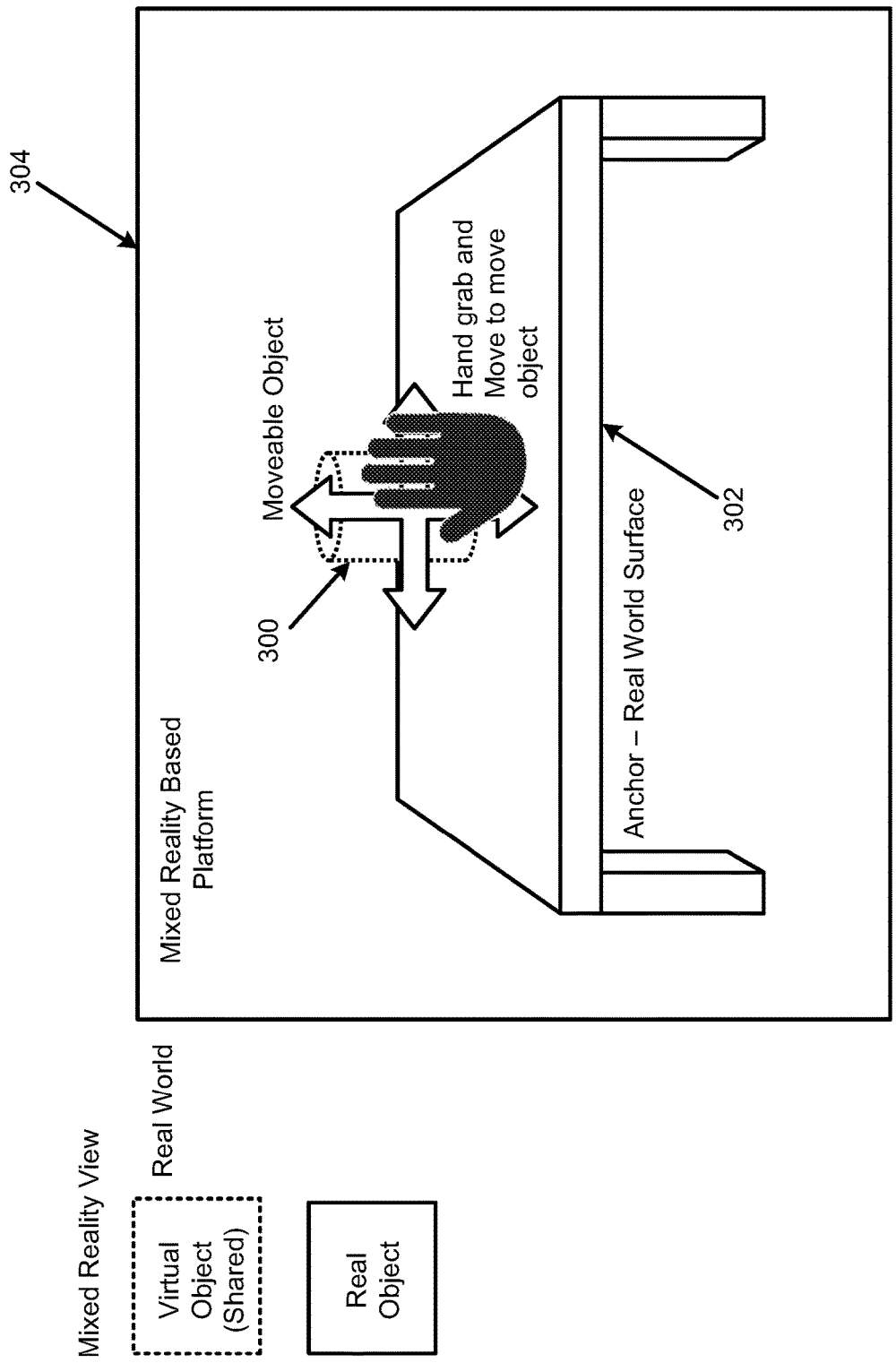
FIG. 3 illustrates individual experiences for the multiplatform based experience generation system of FIG. 1 for a mixed reality based platform, according to an example of the present disclosure.

FIG. 3 illustrates individual experiences for the system 100 for a mixed reality based platform, according to an example of the present disclosure.

Referring to FIG. 3, compared to the PC-based platform of FIG. 2, the movable object 300 for the mixed reality based platform of FIG. 3 may be connected to the global anchor 302 which is represented by a real world surface (e.g., a table). For the example of FIG. 3, the movable object 300 may be disposed on the real world surface (e.g., a table), and moved, for example, by using grab and move operations. For the mixed reality based platform, the global anchor 302 may be positioned relative to an origin where a user of the mixed reality based platform is standing or sitting, and looking. Thus, upon initializing of the mixed reality based platform, for the example of FIG. 3, the mixed reality UI display 304 may include the movable object 300 (e.g., the can of soda) displayed at a center of the global anchor 302 (e.g., represented by the table). In the event a user of the mixed reality based platform is looking at a different position compared to the global anchor 302 (e.g., represented by the table) during initialization of the mixed reality based platform, the system 100 may re-calibrate (e.g., by shifting based on a determined distance from the global anchor 302 and a virtual anchor along the user's line of sight) the coordinates for the global anchor 302 in the mixed reality UI display 304 to properly position the movable object 300 relative to the global anchor 302.

Thus, the global anchor may be described as an agreed upon coordinate relative to which a movable object is marked, irrespective of the platform type. For the examples of FIGS. 2 and 3, the global anchors for the PC-based platform and the mixed reality based platform may include the same coordinates in the PC-based UI display 200 or in the mixed reality based UI display 304 (or another type of UI display) if the mixed reality based platform user is looking in the same direction as the camera for the PC-based platform, or different coordinates if the mixed reality based platform user is looking in a different direction compared to the camera for the PC-based platform. If needed, once of the coordinates of the global anchors for different platform types are adjusted (e.g., by re-calibration), the movable object may be disposed at the same coordinates relative to the global anchor for the corresponding device. For the example of FIGS. 2 and 3, the movable objects 202 and 300 may be disposed at the same relative coordinates (e.g., 0, 0) relative to the global anchors for both the PC-based UI display 200 and the mixed reality based UI display 304. With respect to FIGS. 2 and 3, although the global anchors are described as being different global anchors for the PC-based platform and the mixed reality based platform to facilitate a description of the global anchor, the global anchors are effectively a single global anchor that is positioned and/or defined differently depending on the platform type (e.g., virtual 2D plane for the example of FIG. 2, and table surface for the example of FIG. 3).

For the example of FIGS. 2 and 3, for objects (e.g., the virtual objects) that are shared between different platform types, such virtual objects may be highlighted as being shared. Further, for objects that are not shared (e.g., the real table of FIG. 3), such real objects may be identified in the mixed reality UI display without being marked as being shared.

Figure 4:
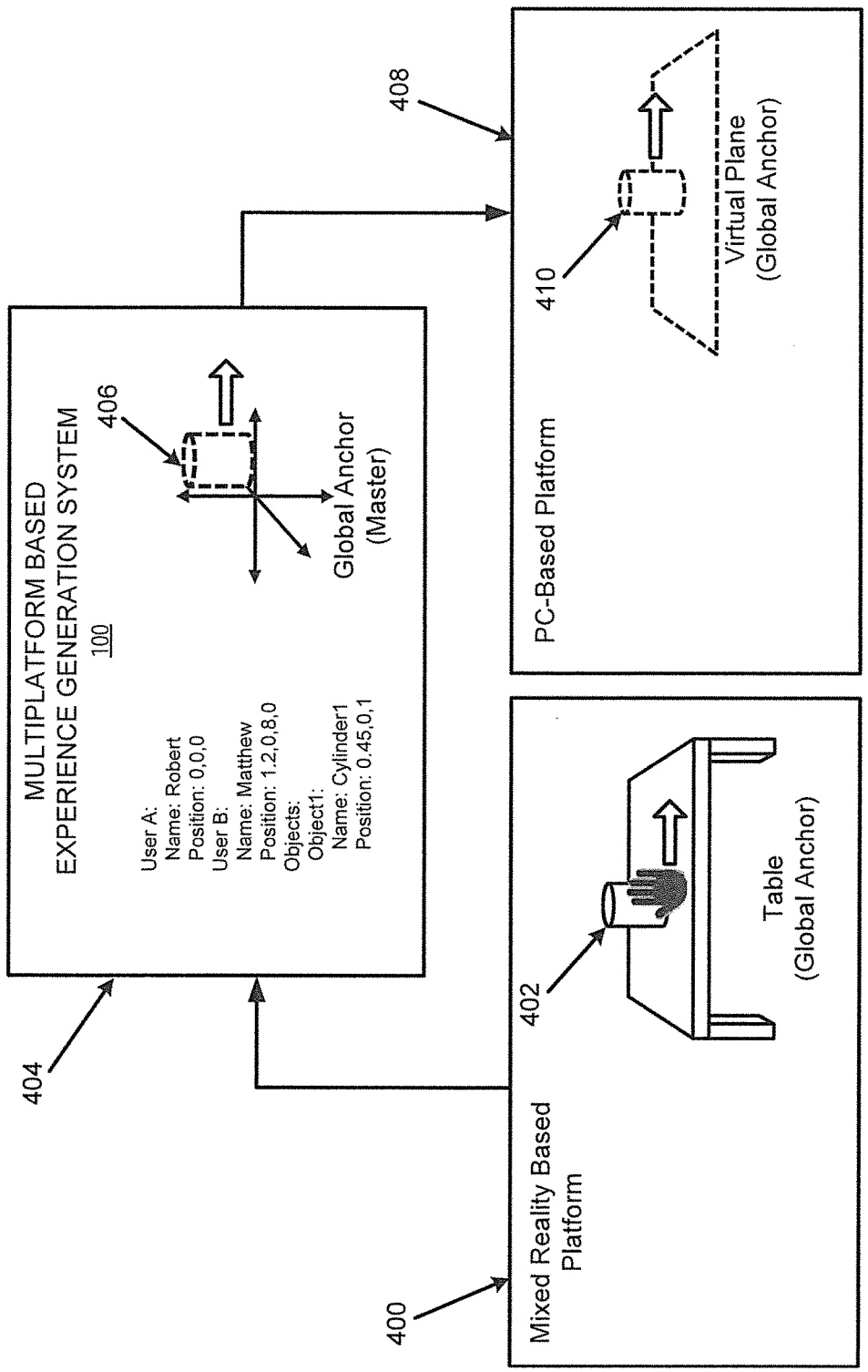
FIG. 4 illustrates a flowchart for sharing of experiences, specifically what is shared and what is not shared, and sharing of intrinsic properties, for the multiplatform based experience generation system of FIG. 1, according to an example of the present disclosure.

FIG. 4 illustrates a flowchart for sharing of experiences, specifically what is shared and what is not shared, and sharing of intrinsic properties, for the multiplatform based experience generation system 100, according to an example of the present disclosure.

For the example of FIG. 4, sharing of experiences between a mixed reality based platform and a PC-based platform is described. At 400, a user of the mixed reality based platform may drag a virtual object (e.g., the movable object 402) using a grab gesture relative to a global anchor (represented by a table). At 404, the system 100 may receive movement data (i.e., change in location, rotation angle, etc.) from the mixed reality based platform, where the movement data may include an indication of the change of an intrinsic property of the movable object 402. Intrinsic properties may be described as properties that are identical across all platform types. For the example of FIG. 4, the movement data may include an indication that is used by the action generator 112 to change a location of the movable object 406 relative to the global anchor (that may be designated as a master global anchor for the system 100). The action generator 112 may update the intrinsic property (e.g., location) of the movable object 406 relative to the global anchor (i.e., the master global anchor), and further update all connected users. Further, the action generator 112 may retain a master list of all intrinsic properties for the movable object 406. At 408, assuming that the connected users include a PC-based platform user, the PC-based platform user may see the virtual object (e.g., the movable object 410) move to a new location relative to the global anchor (represented by a virtual plane).

The action generator 112 may coordinate management of user specific properties. Referring to FIG. 4, at 404, the system 100 may receive movement data from the mixed reality based platform, where the movement data may prompt (e.g., explicitly or implicitly) the action generator 112 to coordinate management of associated user specific properties. For example, with respect to movement, for the mixed reality based platform, the movable object 402 may be highlighted for the mixed reality based platform user who is performing the grab and move operation, without the movable object (e.g., the movable object 410) being highlighted for other platform types.

With respect to sharing of intrinsic properties as disclosed herein with reference to FIG. 4, intrinsic properties may be described as properties that are identical across all platform types. With respect to sharing of position data, a position of an object (e.g., the movable object 402, 406, or 410) may be displayed relative to the global anchor (table, master, or virtual plane). The global anchor may be positioned independently on each device as appropriate. For the example of FIG. 4, on the PC-based platform, the global anchor (e.g., the virtual plane) may be positioned on a center of a screen for the PC-based UI display, and on a mixed reality based platform, the global anchor (e.g., the table surface) may be positioned (or otherwise represented by) a real world object such as a table or a shelf. As disclosed herein with respect to FIG. 4, the global anchor may be used by the action generator 112 to update the intrinsic property (e.g., location) of the movable object relative to the global anchor, and further update all connected users.

Figure 5:
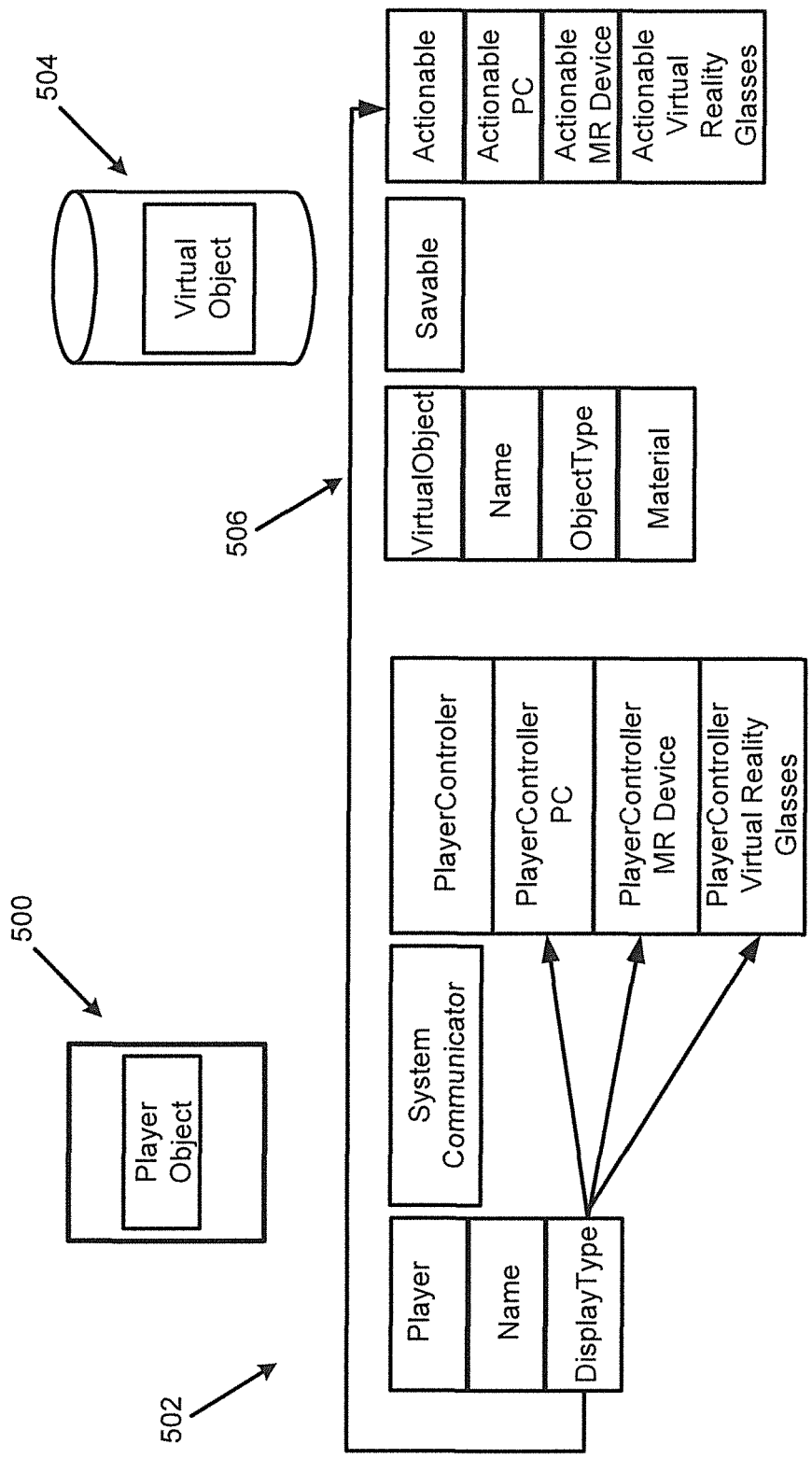
FIG. 5 illustrates a framework for implementing a shared multiplatform experience for the multiplatform based experience generation system of FIG. 1, according to an example of the present disclosure.

FIG. 5 illustrates a framework for implementing a shared multiplatform experience for the multiplatform based experience generation system 100, according to an example of the present disclosure.

Referring to FIG. 5, for the framework for implementing a shared multiplatform experience, for the system 100 and/or for the connected devices 104, as shown at 500, users may be represented as player objects, which have a camera placed in the virtual world. The player objects may include some controls in common across all platforms, but may supplement their controls based on the specifics of the display associated with the player object. For example, pointing with a finger on a mixed reality based platform may perform the same action as a mouse click on a PC-based platform. Thus, as shown 502, the "player", "system communicator" and "playercontroller" may represent logical layers that may be attached to a player object. The "player" layer may include data such as a name, and display type (e.g., PC-based, mixed reality based, mobile device based, etc.) being used by a player. The "playercontroller" layer may provide instructions on how a player is to interface with a virtual object. For example, depending on the display type, different controls may be enabled (e.g., PC-based player control, mixed reality device based player control, virtual reality glasses based player control, etc.). Further, the "system communicator" layer (on a device) may provide for communication between a player and the system 100.

As shown at 504, for the system 100 and/or for the connected devices 104, virtual objects may be represented in the real world. Virtual objects may include different behaviors, denoted actions, depending on what they represent. Examples of actions may include move, rotate, change size, change color, switch the virtual object for a different virtual object, product specific actions (e.g., opening a can), etc. The actions may include certain elements in common, but may include different controls or different effects based on the platform type or player. As shown at 506, "virtualobject", "savable" and "actionable" may represent logical layers that may be attached to a virtual object. The "virtualobject" layer may include data such as a name, object type, and material for a virtual object. Depending on an action, a component of the "virtualobject" layer may be changed. The "savable" layer may provide for saving of a virtual object in a particular format. Under "actionable", different controls or different effects may be included based on the platform type or player, for example, under "actionable PC", "actionable MR Device", "actionable virtual reality glasses", etc. For example, for a PC-based platform, an action of moving (e.g., changing a location, rotation angle, etc.) a virtual object implemented by the "actionable PC" block may include selecting the virtual object and moving the virtual object by a mouse select/drag operation. For a virtual reality glasses based platform, an action of moving a virtual object implemented by the "actionable virtual reality glasses" block may include selecting the virtual object by gazing at the virtual object, and moving the virtual object based on eye movement.

The action generator 112 may provide for implementation of sharing of content between different UI displays of different platforms, and for implementation of a multiplatform experience. For example, platform type may include a specific UI layout designed to meet the needs of the platform. The action generator 112 may operate in conjunction with the various "playercontroller" layers to provide instructions on how a player is to interface with a virtual object. The action generator 112 may provide for the implementation of drag and drop operations, where drag and drop operations may be used to import any type of virtual objects that are to be used. If custom actions are needed, such actions may be based on templates for existing actions. The action generator 112 may eliminate the need to write specific machine readable instructions for changes made to adjust for a particular display (e.g., a PC-based display, a mixed reality based display, etc.). The action generator 112 may eliminate the need to write specific machine readable instructions for tracking of intrinsic properties of an object (e.g., as disclosed herein with reference to FIG. 4 with respect to intrinsic properties of the movable object 406), a player camera that behaves uniformly on multiple devices (e.g., as disclosed herein with reference to FIG. 4 with respect to the global anchor), and implementing networking capability to include multiple, dissimilar devices to share a scene (e.g., as disclosed herein with reference to FIG. 4 with respect to the mixed reality based platform and the PC-based platform). Further, the action generator 112 may implement custom behaviors for each action in each display environment.

Figure 6:
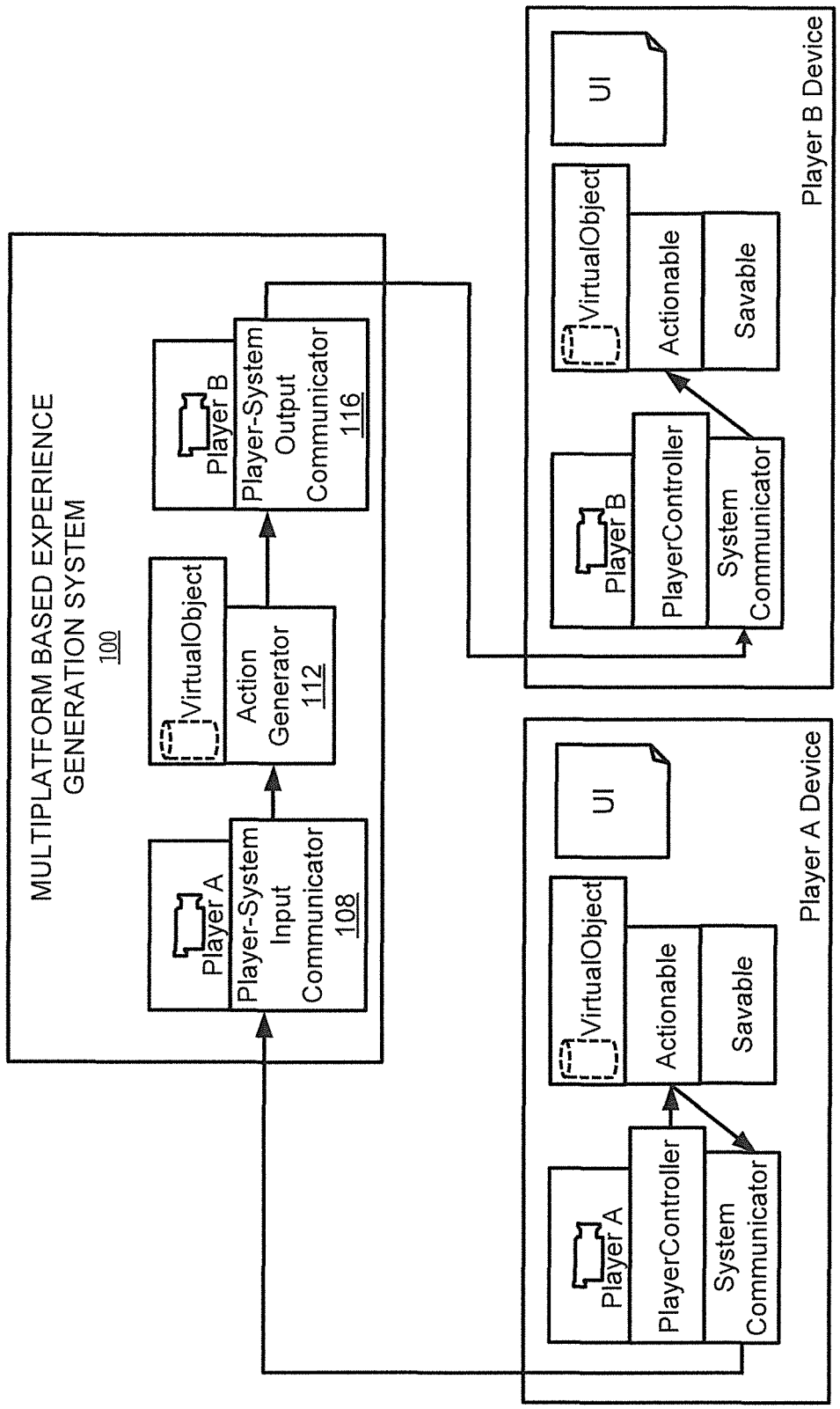
FIG. 6 illustrates an action chain for the multiplatform based experience generation system of FIG. 1, according to an example of the present disclosure.

FIG. 6 illustrates an action chain for the multiplatform based experience generation system 100, according to an example of the present disclosure.

Referring to FIG. 6, the example of the action chain may include player-A that uses a particular device type (denoted "player-A device"), and player-B that uses a different device type (denoted "player-B device"). Although the example of FIG. 6 is illustrated with a player-A device and a player-B device, the action chain may include a plurality of players. Moreover, although the example of FIG. 6 is illustrated with the player-A device performing an action that is communicated and updated for the player-B device, the direction of the action chain may be performed between any player devices. For the example of FIG. 6, action may begin when player-A performing an action on a virtual object. The action by the player-A, which is detected by the playercontroller layer, may trigger communication from the player-A device, via the system communicator on the player-A device, to the player-system input communicator 108. The player-A device may perform the action (e.g., via the actionable layer on the player-A device) on the virtual object. The player-system input communicator 108 may also perform the action on the system 100 to maintain a current status (e.g., the master version) of the virtual object. In this regard, the performance of the action on the virtual object at the system 100 (e.g., via the action generator 112) may trigger communication with other connected players (e.g., the player-B device for the example of FIG. 6) to properly update the intrinsic variables of the virtual object on the connected player devices. Thus, all other players, such as the player-B device in the example scenario may receive information from the player-system output communicator 116 to update their virtual objects to be in sync with the changes performed on the player-A device. For the player-B device, the player-system output communicator 116 may communicate with the system communicator of the player-B device. The action performed on the virtual object at the system 100 may thus be performed on the player-B device via the action generator 112 (which may include an actionable layer) on the player-B device to update the virtual object on the player-B device to be in sync with the changes performed on the player-A device.

Figure 7:
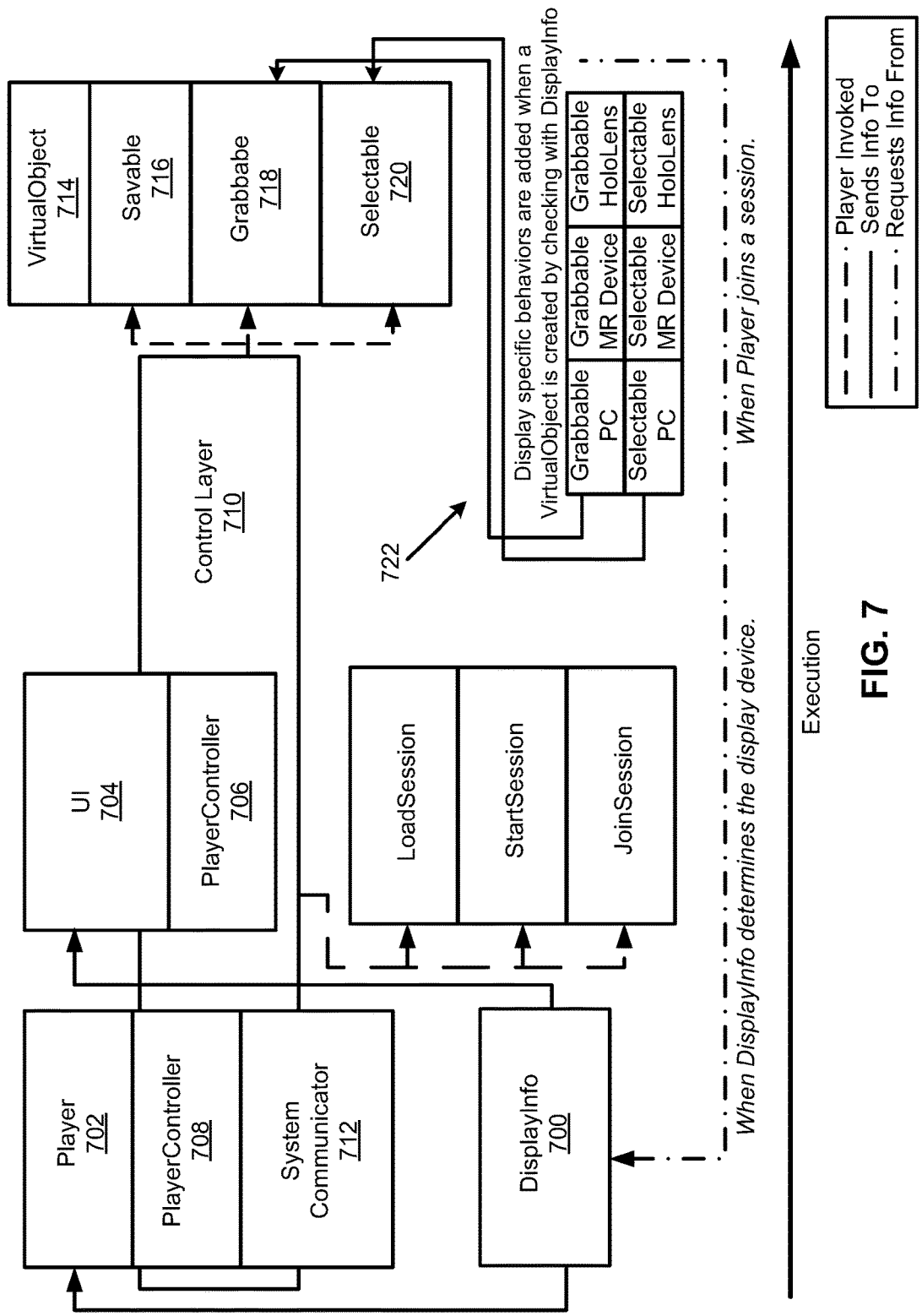
FIG. 7 illustrates an architecture for implementation of features of the multiplatform based experience generation system of FIG. 1 in a device, according to an example of the present disclosure.

FIG. 7 illustrates an architecture for implementation of features of the system 100 in a device (e.g., one of the connected devices 104), according to an example of the present disclosure.

Referring to FIG. 7, the "displayinfo" layer 700 may determine the display type of a device for the system 100. The display type determined by the "displayinfo" layer may be fed to the player layer 702 and the UI layer 704. The player layer 702 may hold the information about the user (e.g., player object as disclosed herein), such as name, location, title, etc. The UI layer 704 may provide for the adaptation to the display to the specifics of the device platform that is used by a player. The "playercontroller" layer 706 associated with the UI layer may perform various functions related to display of information and/or virtual objects on a UI display, whereas the "playercontroller" layer 708 associated with the player layer may perform functions related to movement of virtual objects. In this regard, the "playercontroller" layers may be included in a control layer 710 that handles all inputs (e.g., keyboard, button, mouse, gesture, voice, etc.). The "system communicator" layer 712 may provide for communication between a player and the system 100. The "virtualobject" layer 714 may include data such as a name, object type, and material for a virtual object. Depending on an action, a component of the "virtualobject" layer may be changed. The "savable" layer 716 may provide for saving of a virtual object in a particular format. The "grabbable" layer 718 and the "selectable" layer 720 may be respectively provided for an object to be moved around in a scene, and data to be displayed with respect to an object. The "loadsession", "startsession", and "joinsession" layers may be respectively provided for loading a scenario from memory, beginning a new session, and joining a session in progress. At 722, display specific behaviors may be added when a virtual object is created by checking with the "displayinfo" layer at 700.

As described herein, the elements of the system 100 may be machine readable instructions stored on a non-transitory computer readable medium. In addition, or alternatively, the elements of the system 100 may be hardware or a combination of machine readable instructions and hardware.

Figure 8:
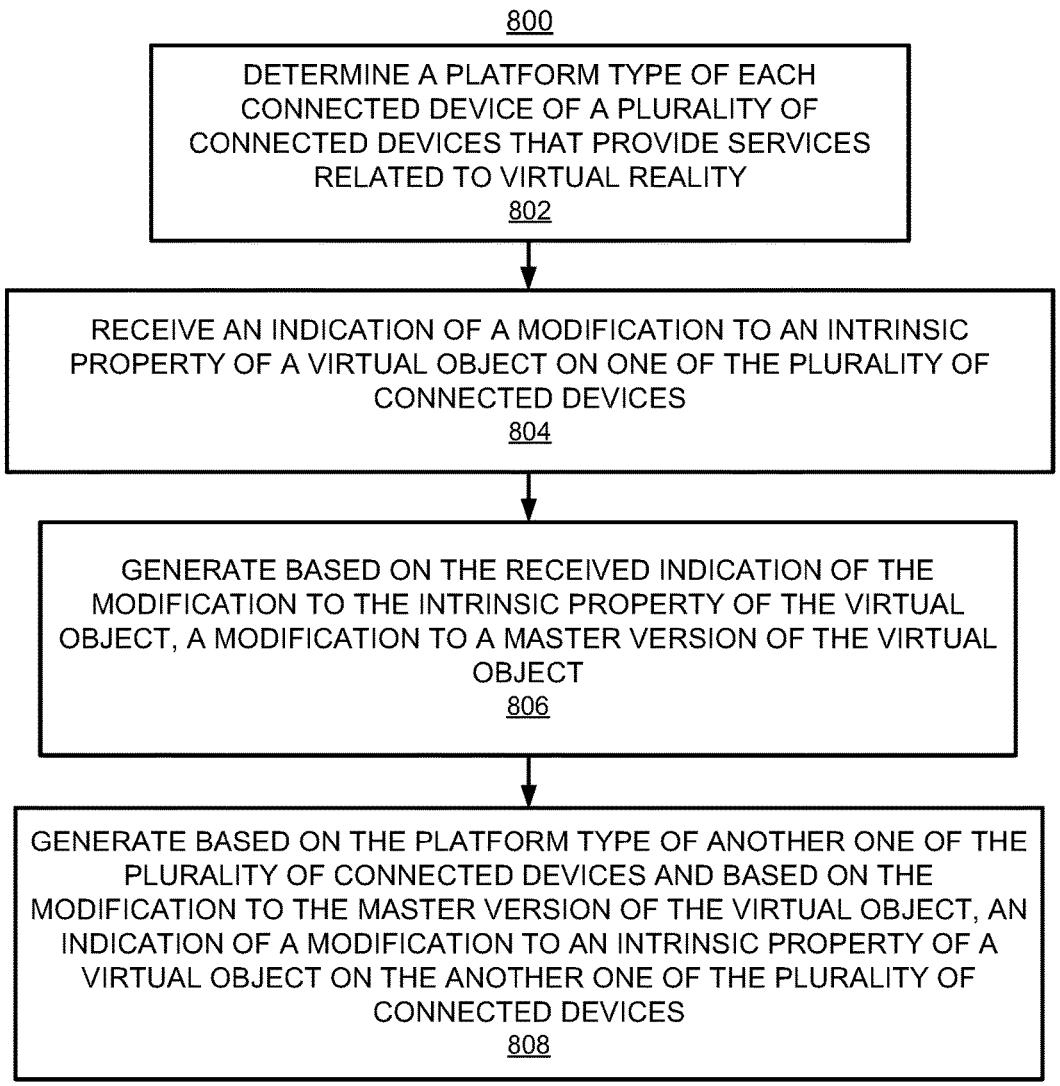
FIG. 8 illustrates a flowchart of a method for multiplatform based experience generation, according to an example of the present disclosure.
Figure 9:
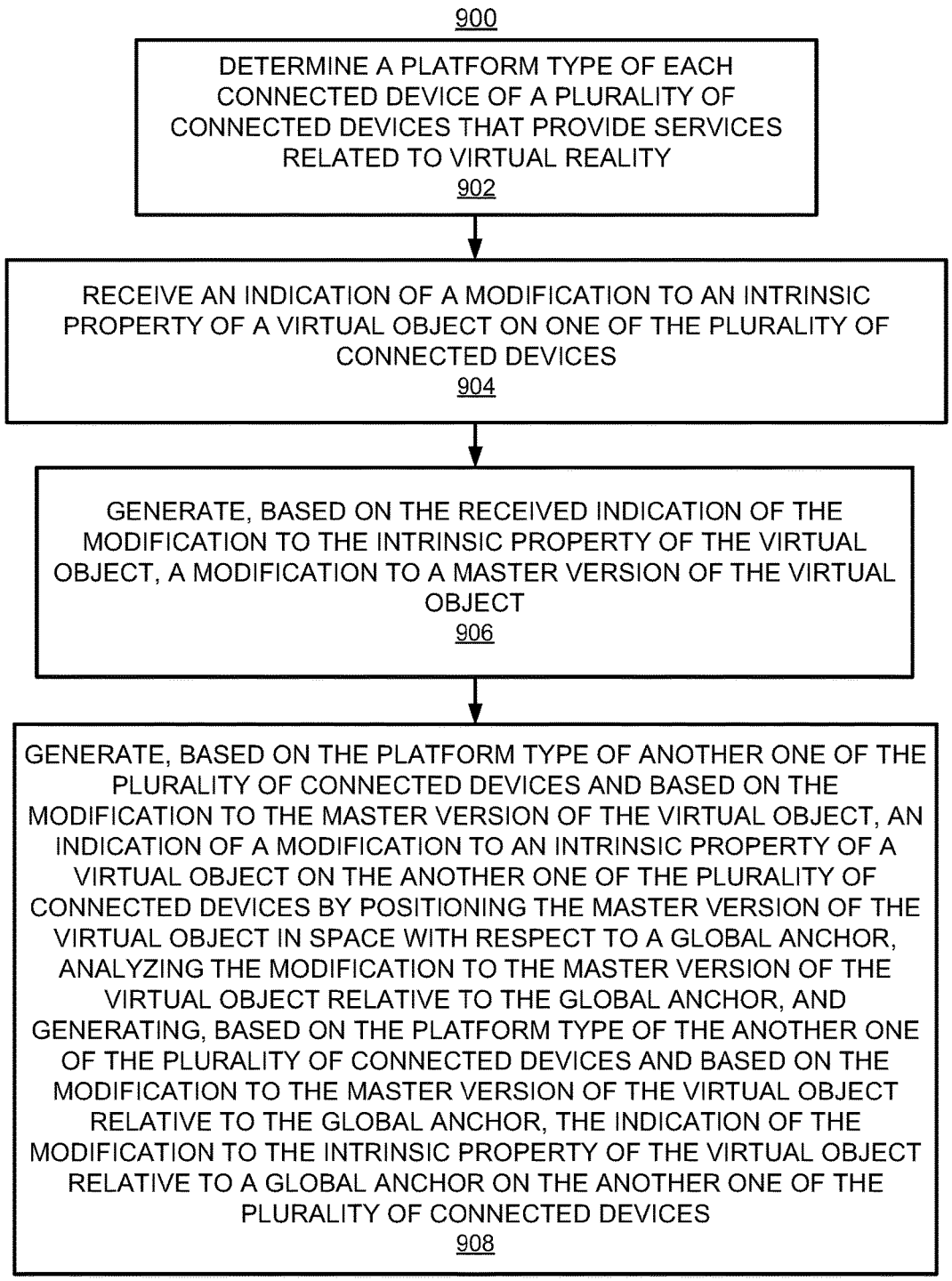
FIG. 9 illustrates a flowchart of another method for multiplatform based experience generation, according to an example of the present disclosure.

FIGS. 8 and 9 respectively illustrate flowcharts of methods 800 and 900 for multiplatform based experience generation, according to examples. The methods 800 and 900 may be implemented on the system 100 described above with reference to FIGS. 1-7 by way of example and not limitation. The methods 800 and 900 may be practiced in other systems.

Referring to FIGS. 1-8, and particularly FIG. 8, at block 802, the method 800 may include determining (e.g., by the platform analyzer 106) a platform type of each connected device of a plurality of connected devices 104 that provide services related to virtual reality.

At block 804, the method 800 may include receiving (e.g., by the player-system input communicator 108) an indication of a modification to an intrinsic property of a virtual object (e.g., virtual object 110) on one of the plurality of connected devices 104.

At block 806, the method 800 may include generating (e.g., by the action generator 112) based on the received indication of the modification to the intrinsic property of the virtual object, a modification to a master version of the virtual object 114.

At block 808, the method 800 may include generating (e.g., by the player-system output communicator 116) based on the platform type of another one of the plurality of connected devices 104 and based on the modification to the master version of the virtual object 114, an indication of a modification to an intrinsic property of a virtual object 118 on the another one of the plurality of connected devices 104 by analyzing the modification to the master version of the virtual object 114 relative to a global anchor, and generating, based on the platform type of the another one of the plurality of connected devices 104 and based on the modification to the master version of the virtual object 114 relative to the global anchor, the indication of the modification to the intrinsic property of the virtual object 118 relative to a global anchor on the another one of the plurality of connected devices 104.

According to examples, for the method 800, the intrinsic property of the virtual object 110 on the one of the plurality of connected devices 104 may include a location or a rotation angle (e.g., relative to a two-dimensional or three-dimensional coordinate system) of the virtual object 110 on the one of the plurality of connected devices 104, and the intrinsic property of the virtual object 118 on the another one of the plurality of connected devices 104 may include corresponding movement or rotation of the virtual object on the another one of the plurality of connected devices.

According to examples, for the method 800, the platform type of the one of the plurality of connected devices 104 and the platform type of the another one of the plurality of connected devices 104 may be selected from a personal computer (PC), a mixed reality system, a mobile phone, and virtual reality glasses, and the platform type of the one of the plurality of connected devices 104 may be different from the platform type of the another one of the plurality of connected devices 104.

According to examples, the method 800 may further include positioning the master version of the virtual object 114 in space with respect to the global anchor for the master version of the virtual object 114, where coordinates of the virtual object 110 on the one of the plurality of connected devices 104 relative to a global anchor on the one of the plurality of connected devices 104 may be identical to coordinates of the virtual object 118 on the another one of the plurality of connected devices 104 relative to the global anchor on the another one of the plurality of connected devices 104.

According to examples, for the method 800, generating, based on the platform type of the another one of the plurality of connected devices 104 and based on the modification to the master version of the virtual object 114, the indication of the modification to the intrinsic property of the virtual object 118 on the another one of the plurality of connected devices 104, may further include determining, based on the platform type of another one of the plurality of connected devices 104, capabilities of the another one of the plurality of connected devices 104 to perform the modification to the intrinsic property of the virtual object 118 on the another one of the plurality of connected devices, updating, based on the capabilities of the another one of the plurality of connected devices 104 to perform the modification to the intrinsic property of the virtual object 118 on the another one of the plurality of connected devices 104, the modification to the intrinsic property of the virtual object 110 on the one of the plurality of connected devices 104, and generating, based on the update to the modification to the intrinsic property of the virtual object 110 on the one of the plurality of connected devices 104 and based on the modification to the master version of the virtual object 114, the indication of the modification to the intrinsic property of the virtual object 118 on the another one of the plurality of connected devices 104.

Referring to FIGS. 1-7 and 9, and particularly FIG. 9, at block 902, the method 900 may include determining (e.g., by the platform analyzer 106) a platform type of each connected device of a plurality of connected devices 104 that provide services related to virtual reality.

At block 904, the method 900 may include receiving (e.g., by the player-system input communicator 108) an indication of a modification to an intrinsic property of a virtual object (e.g., virtual object 110) on one of the plurality of connected devices 104.

At block 906, the method 900 may include generating (e.g., by the action generator 112), based on the received indication of the modification to the intrinsic property of the virtual object, a modification to a master version of the virtual object 114.

At block 908, the method 900 may include generating (e.g., by the player-system output communicator 116), based on the platform type of another one of the plurality of connected devices 104 and based on the modification to the master version of the virtual object, an indication of a modification to an intrinsic property of a virtual object 118 on the another one of the plurality of connected devices 104 by positioning the master version of the virtual object 114 in space with respect to a global anchor, analyzing the modification to the master version of the virtual object 114 relative to the global anchor, and generating, based on the platform type of the another one of the plurality of connected devices 104 and based on the modification to the master version of the virtual object 114 relative to the global anchor, the indication of the modification to the intrinsic property of the virtual object 118 relative to a global anchor on the another one of the plurality of connected devices 104. Coordinates of the virtual object 110 on the one of the plurality of connected devices 104 relative to a global anchor on the one of the plurality of connected devices 104 may be identical to coordinates of the virtual object 118 on the another one of the plurality of connected devices 104 relative to the global anchor on the another one of the plurality of connected devices 104.

According to examples, the method 900 may further include coordinating management of a user specific property related to the another one of the plurality of connected devices 104 based on the platform type of the another one of the plurality of connected devices 104.

According to examples, for the method 900, the user specific property may include highlighting of the virtual object 118 on the another one of the plurality of connected devices 104 when the virtual object 110 on the one of the plurality of connected devices 104 is not highlighted.

According to examples, for the method 900, the user specific property may include not highlighting of the virtual object 118 on the another one of the plurality of connected devices 104 when the virtual object 110 on the one of the plurality of connected devices 104 is highlighted.

Figure 10:
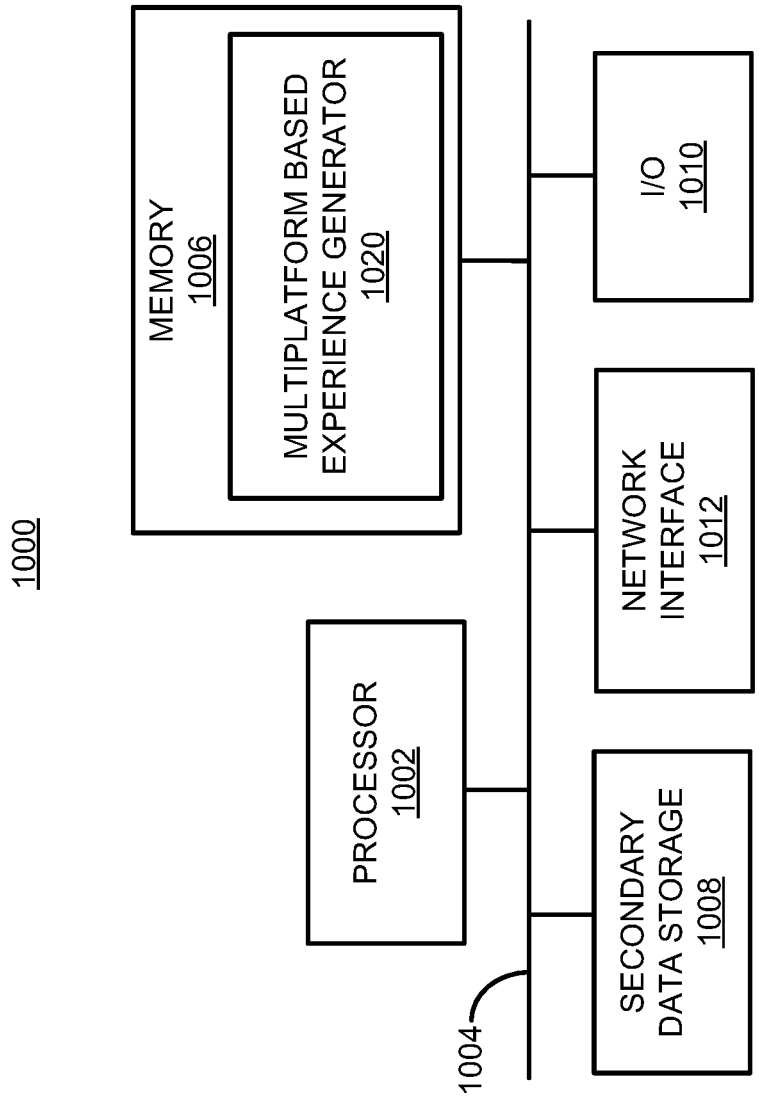
FIG. 10 illustrates a computer system, according to an example of the present disclosure.

FIG. 10 shows a computer system 1000 that may be used with the examples described herein. The computer system may represent a generic platform that includes components that may be in a server or another computer system. The computer system 1000 may be used as a platform for the system 100. The computer system 1000 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1000 may include a processor 1002 that may implement or execute machine readable instructions performing some or all of the methods, functions and other processes described herein. Commands and data from the processor 1002 may be communicated over a communication bus 1004. The computer system may also include a main memory 1006, such as a random access memory (RAM), where the machine readable instructions and data for the processor 1002 may reside during runtime, and a secondary data storage 1008, which may be non-volatile and stores machine readable instructions and data. The memory and data storage are examples of computer readable mediums. The memory 1006 may include a multiplatform based experience generator 1020 including machine readable instructions residing in the memory 1006 during runtime and executed by the processor 1002. The multiplatform based experience generator 1020 may include the elements of the multiplatform based experience generation system 100 shown with reference to FIGS. 1-7.

The computer system 1000 may include an I/O device 1010, such as a keyboard, a mouse, a display, etc. The computer system may include a network interface 1012 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A multiplatform based experience generation system comprising:
   a processor; and
   a memory storing machine readable instructions that when executed by the processor cause the processor to:
     determine a set of connected devices that provide services related to virtual reality;
     determine a platform type of each of the connected devices;
     receive an indication of a modification to an intrinsic property of a virtual object on one of the set of connected devices;
     generate, based on the received indication of the modification to the intrinsic property of the virtual object, a modification to a master version of the virtual object; and
     generate, based on the platform type of another one of the set of connected devices and based on the modification to the master version of the virtual object, an indication of a modification to an intrinsic property of a virtual object on the another one of the set of connected devices by
       analyzing the modification to the master version of the virtual object relative to a global anchor that is defined by a plane, and
       generating, based on the platform type of the another one of the set of connected devices and based on the modification to the master version of the virtual object relative to the global anchor, the indication of the modification to the intrinsic property of the virtual object relative to the global anchor on the another one of the set of connected devices, wherein the virtual object on the one of the set of connected devices is generally identical to the virtual object on the another one of the set of connected devices.

2. The multiplatform based experience generation system according to claim 1, wherein
   the intrinsic property of the virtual object on the one of the set of connected devices includes a location of the virtual object on the one of the set of connected devices, and
   the intrinsic property of the virtual object on the another one of the set of connected devices includes a corresponding location of the virtual object on the another one of the set of connected devices.

3. The multiplatform based experience generation system according to claim 1, wherein the platform type of the one of the set of connected devices and the platform type of the another one of the set of connected devices are selected from a personal computer (PC), a mixed reality system, a mobile phone, and virtual reality glasses, and the platform type of the one of the set of connected devices is different from the platform type of the another one of the set of connected devices.

4. The multiplatform based experience generation system according to claim 1, wherein the master version of the virtual object is positioned in space with respect to the global anchor.

5. The multiplatform based experience generation system according to claim 1, wherein the global anchor includes a virtual structure for a personal computer (PC) platform type device.

6. The multiplatform based experience generation system according to claim 4, wherein the global anchor includes characteristics of a real structure for a mixed reality platform type device.

7. The multiplatform based experience generation system according to claim 1, wherein coordinates of the virtual object on the one of the set of connected devices relative to the global anchor on the one of the set of connected devices are identical to coordinates of the virtual object on the another one of the set of connected devices relative to the global anchor on the another one of the set of connected devices.

8. The multiplatform based experience generation system according to claim 1, wherein the machine readable instructions when executed by the processor further cause the processor to:
determine, based on the platform type of another one of the set of connected devices, capabilities of the another one of the set of connected devices to perform the modification to the intrinsic property of the virtual object on the another one of the set of connected devices;
update, based on the capabilities of the another one of the set of connected devices to perform the modification to the intrinsic property of the virtual object on the another one of the set of connected devices, the modification to the intrinsic property of the virtual object on the one of the set of connected devices; and
generate, based on the update to the modification to the intrinsic property of the virtual object on the one of the set of connected devices and based on the modification to the master version of the virtual object, the indication of the modification to the intrinsic property of the virtual object on the another one of the set of connected devices.

9. The multiplatform based experience generation system according to claim 1, wherein the machine readable instructions when executed by the processor further cause the processor to:
coordinate management of a user specific property related to the another one of the set of connected devices based on the platform type of the another one of the set of connected devices.

10. The multiplatform based experience generation system according to claim 9, wherein the user specific property includes highlighting of the virtual object on the another one of the set of connected devices when the virtual object on the one of the set of connected devices is not highlighted.

11. The multiplatform based experience generation system according to claim 1, wherein the machine readable instructions when executed by the processor further cause the processor to:
determine an input characteristic of each of the connected devices; and
generate, based on the input characteristic of another one of the set of connected devices and based on the modification to the master version of the virtual object, the indication of the modification to the intrinsic property of the virtual object on the another one of the set of connected devices.

12. A method for multiplatform based experience generation, the method comprising:
determining, by at least one hardware processor, a platform type of each connected device of a plurality of connected devices that provide services related to virtual reality;
receiving, by the at least one hardware processor, an indication of a modification to an intrinsic property of a virtual object on one of the plurality of connected devices;
generating, by the at least one hardware processor, based on the received indication of the modification to the intrinsic property of the virtual object, a modification to a master version of the virtual object; and
generating, by the at least one hardware processor, based on the platform type of another one of the plurality of connected devices and based on the modification to the master version of the virtual object, an indication of a modification to an intrinsic property of a virtual object on the another one of the plurality of connected devices by
analyzing the modification to the master version of the virtual object relative to a global anchor that is defined by a plane, and
generating, based on the platform type of the another one of the plurality of connected devices and based on the modification to the master version of the virtual object relative to the global anchor, the indication of the modification to the intrinsic property of the virtual object relative to the global anchor on the another one of the plurality of connected devices.

13. The method of claim 12, wherein
the intrinsic property of the virtual object on the one of the plurality of connected devices includes a location or a rotation angle of the virtual object on the one of the plurality of connected devices, and
the intrinsic property of the virtual object on the another one of the plurality of connected devices includes a corresponding location or rotation angle of the virtual object on the another one of the plurality of connected devices.

14. The method of claim 12, wherein
the platform type of the one of the plurality of connected devices and the platform type of the another one of the plurality of connected devices are selected from a personal computer (PC), a mixed reality system, a mobile phone, and virtual reality glasses, and
the platform type of the one of the plurality of connected devices is different from the platform type of the another one of the plurality of connected devices.

15. The method of claim 12, further comprising:
positioning the master version of the virtual object in space with respect to the global anchor for the master version of the virtual object, wherein coordinates of the virtual object on the one of the plurality of connected devices relative to the global anchor on the one of the plurality of connected devices are identical to coordinates of the virtual object on the another one of the plurality of connected devices relative to the global anchor on the another one of the plurality of connected devices.

16. The method of claim 12, wherein generating, based on the platform type of the another one of the plurality of connected devices and based on the modification to the master version of the virtual object, the indication of the modification to the intrinsic property of the virtual object on the another one of the plurality of connected devices, further comprises:
determining, based on the platform type of another one of the plurality of connected devices, capabilities of the another one of the plurality of connected devices to perform the modification to the intrinsic property of the virtual object on the another one of the plurality of connected devices;
updating, based on the capabilities of the another one of the plurality of connected devices to perform the modification to the intrinsic property of the virtual object on the another one of the plurality of connected devices, the modification to the intrinsic property of the virtual object on the one of the plurality of connected devices; and
generating, based on the update to the modification to the intrinsic property of the virtual object on the one of the plurality of connected devices and based on the modification to the master version of the virtual object, the indication of the modification to the intrinsic property of the virtual object on the another one of the plurality of connected devices.

17. A non-transitory computer readable medium having stored thereon machine readable instructions for multiplatform based experience generation, the machine readable instructions when executed cause at least one hardware processor to:
determine a platform type of each connected device of a plurality of connected devices that provide services related to virtual reality;
receive an indication of a modification to an intrinsic property of a virtual object on one of the plurality of connected devices;
generate, based on the received indication of the modification to the intrinsic property of the virtual object, a modification to a master version of the virtual object; and
generate, based on the platform type of another one of the plurality of connected devices and based on the modification to the master version of the virtual object, an indication of a modification to an intrinsic property of a virtual object on the another one of the plurality of connected devices by
positioning the master version of the virtual object in space with respect to a global anchor that is defined by a plane,
analyzing the modification to the master version of the virtual object relative to the global anchor, and
generating, based on the platform type of the another one of the plurality of connected devices and based on the modification to the master version of the virtual object relative to the global anchor, the indication of the modification to the intrinsic property of the virtual object relative to the global anchor on the another one of the plurality of connected devices, wherein coordinates of the virtual object on the one of the plurality of connected devices relative to the global anchor on the one of the plurality of connected devices are identical to coordinates of the virtual object on the another one of the plurality of connected devices relative to the global anchor on the another one of the plurality of connected devices.

18. The non-transitory computer readable medium of claim 17, further comprising machine readable instructions that when executed further cause the at least one hardware processor to:
coordinate management of a user specific property related to the another one of the plurality of connected devices based on the platform type of the another one of the plurality of connected devices.

19. The non-transitory computer readable medium of claim 18, wherein the user specific property includes highlighting of the virtual object on the another one of the plurality of connected devices when the virtual object on the one of the plurality of connected devices is not highlighted.

20. The non-transitory computer readable medium of claim 18, wherein the user specific property includes not highlighting of the virtual object on the another one of the plurality of connected devices when the virtual object on the one of the plurality of connected devices is highlighted.

* * * * *